United States Patent [19]

Taylor

[11] Patent Number: 4,921,281
[45] Date of Patent: May 1, 1990

[54] SAFETY CONNECTION INTO PASSAGES IN A TUBULAR BODY

[75] Inventor: Kennard W. Taylor, Houston, Tex.

[73] Assignee: Cameron Iron Works USA, Inc., Houston, Tex.

[21] Appl. No.: 301,629

[22] Filed: Jan. 25, 1989

[51] Int. Cl.$^5$ .............................................. F16L 55/10
[52] U.S. Cl. ...................................... 285/90; 285/924
[58] Field of Search .................... 285/90, 81, 356, 924, 285/393, 13, 14; 251/149.9; 138/89, 94, 92

[56] References Cited

U.S. PATENT DOCUMENTS

| | | | |
|---|---|---|---|
| 1,284,159 | 11/1918 | Sickman | 285/90 |
| 2,689,754 | 9/1954 | Dunton | 285/924 |
| 2,869,752 | 1/1959 | Hall | 285/90 |
| 2,943,869 | 7/1960 | Nordin | 285/90 |
| 3,107,107 | 10/1963 | Guarnaschell | 285/90 |
| 3,574,359 | 4/1971 | Klein | 285/86 |
| 3,766,947 | 10/1973 | Osburn | 138/89 |
| 4,133,560 | 1/1979 | Ishikawa et al. | 285/81 |
| 4,249,670 | 2/1981 | Hug | 220/295 |

Primary Examiner—Dave W. Arola

[57] ABSTRACT

A safety connection for connecting a plug into a tubular member such as in a passage of a choke or valve body, the tubular member having a threaded port extending into the interior of the passage, a plug body positioned within said passage and having an external groove being aligned with the opening of the port into the interior of the passage, a threaded plug positioned within said port, and having an inner end engaging within the external groove in the plug body, sealing means between said plug body and the interior of said passage, means for sealing between the interior of said threaded plug and the threaded port, a vent opening extending through said threaded port and being sealed by the seating of said threaded plug in said threaded port, the partial unthreading of said threaded plug outwardly in said threaded port opening the vent opening for venting pressure from within the tubular member while maintaining the inner end of the threaded plug in engagement with the groove in the plug body to retain it in its seated position with the tubular member.

6 Claims, 6 Drawing Sheets

SAFETY CONNECTION INTO PASSAGES IN A TUBULAR BODY

BACKGROUND

The present invention relates to an improved connection for the blanking plug or bonnet to be used in being secured to a choke body so that they will not be a hazard while being removed from the choke body or when they have been subjected to corrosive fluids.

Prior to the present invention chokes designed for use with corrosive fluids such as hydrogen sulphide have had threaded connections for connecting the blanking plug and the bonnet to the choke body. As these threads are subjected to the corrosive action of the fluids passing through the choke, the corrosive fluids have been found to attack the threaded connections between the body and each of the blanking plug and the bonnet.

Additionally, chokes have had a blanking plug connected into the choke body by the use of a securing ring or nut and have included a tapered sealing shoulder for engaging the tapered seat within the choke body. This structure is illustrated in the drawings and described in the specification. The disadvantage of such structure is that if the securing ring or nut is unthreaded while there is pressure in the choke body, the blanking plug will be forcibly ejected from within the choke body.

The U.S. Pat. No. 4,133,560 discloses a plug for connecting into a pressure container and the plug includes an outer flange and inner opposed projections which pass through recesses in the hole in the pressure container so that when the plug is rotated the projections and the flange engage opposite sides of the wall of the pressure contained. This structure is designed to protect the plug from releasing from the wall if the weld securing the plug to the container fails.

U.S.Pat. No. 3,574,359 discloses a conduit coupling including a socket and a plug with the plug being fully inserted into the socket and detents in the socket held in place by a sleeve threaded to the exterior of the socket to retain the plug in its desired connected position.

U.S.Pat. No. 4,249,670 a cap for connection to a pressure tank and having a pressure venting means which allows tank pressure to be vented prior to unlocking and removing the cap. The cap assembly includes an internal tubular member threaded onto a tube connecting to the pressure tank and a cap surrounding the tubular member and having a J slot and pin type of connection therebetween. The cap is biased in a direction to maintain its connection to the tubular member and at a position in which there is a seal between the exterior of the tubular member and the interior of the cap. The cap includes an inner groove which when opposite the seal allows venting of the pressure from the interior of the tubular member.

Some companies have in the past provided fittings and joints which involve the inclusion of a plug held within the passage with a gland nut and a vent port which allows the venting of any fluid under pressure to which the plug is exposed prior to the completion of the unthreading of the gland nut.

SUMMARY

The present invention is directed to an improved connection to a choke body or other type of valve body which protects the connection against release even when subjected to severely corrosive fluids. The connection is secured into an opening in a choke body and includes the element which is to be secured to the body, a nut which is threaded to the exterior of the body around the opening into the body, an external flange on the element to be engaged by the nut, sealing means between the inner exterior of the element and the interior of the body opening, a plurality of pins and a slotted rib providing a safety connection between the element and the body and means for controlling the relative rotary positioning of the element within the body opening to assist in the proper positioning of the pins and slotted rib safety connection.

An object of the present invention is to provide an improved connection of a body into a structure containing corrosive fluids under pressure in which the connection can allow release of trapped pressure with and the securing means be completely released without releasing the plug from within the body from the structure.

Another object is to provide a connection for a blanking plug and bonnet into a choke which prevents the launching of the plug and bonnet from the choke should the pressure containing connection fail under pressure.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 5:
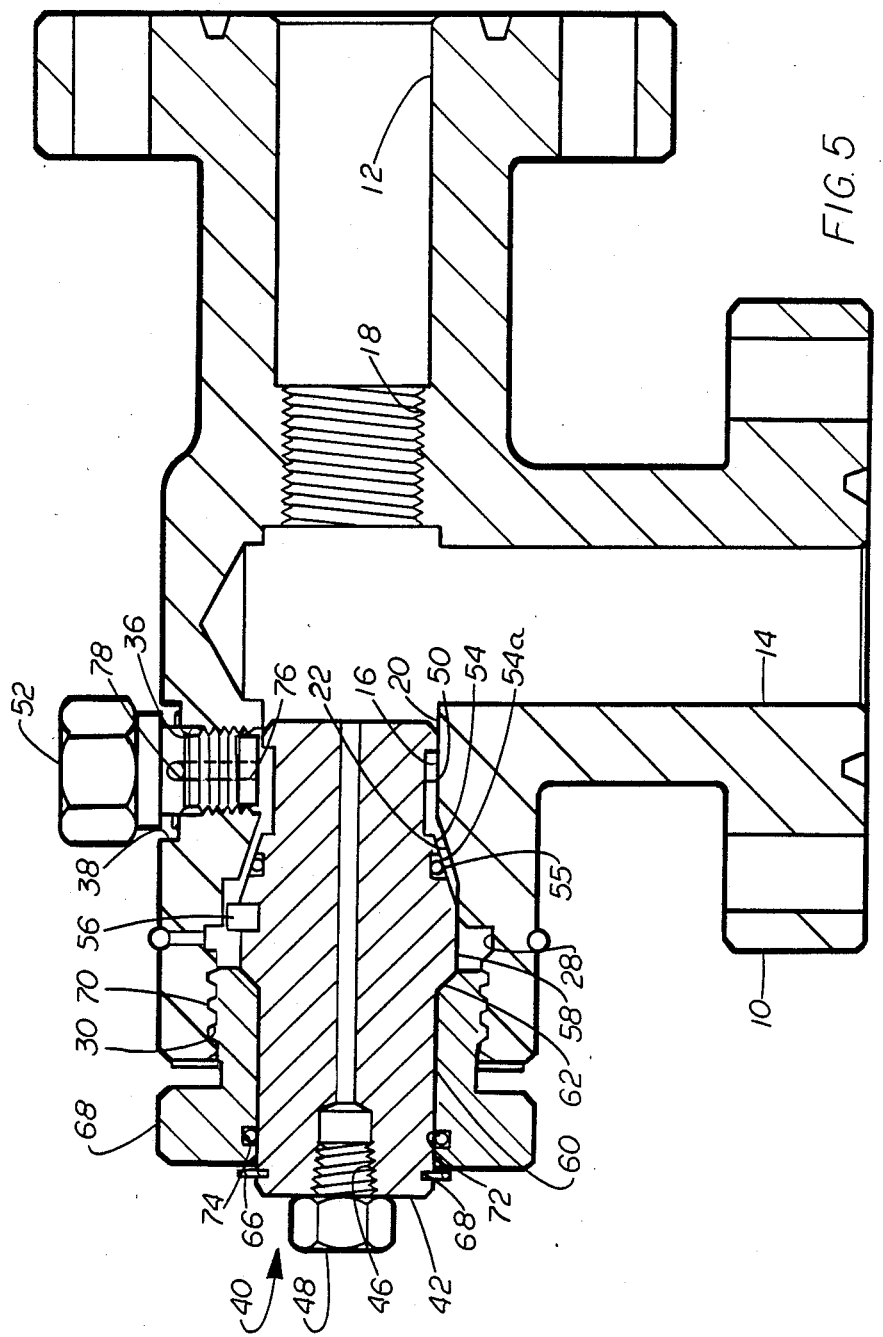
FIG. 5 is another sectional view of the improved connection of the present invention but illustrating the partial loosening of the gland nut.

Choke C of the prior art as illustrated in FIG. 5 includes the body B having passages P1, P2 and P3. Flow bean FB is threaded into passage P1 and blanking plug BP is positioned in passage P2. Tapered seat S1 is provided near the inner end of passage P2 and blanking plug BP includes seal S on its tapered inner shoulder S2 which sealingly engages tapered seat S1. Threaded securing ring or nut N engages external threads T on the exterior of body B surrounding passage P2 to retain blanking plug BP within passage P2. Nut N is held in position around blanking plug BP between snap ring SR and outer flange OF on blanking plug BP. If nut N is unthreaded while there is pressure within choke body B, the pressure may forcibly eject blanking plug BP out of passage P2. Nut N includes the provision of an opening or port O through which some bleeding of the pressure may occur during the unthreading after seal S disengages from tapered seat S1.

Figure 1:
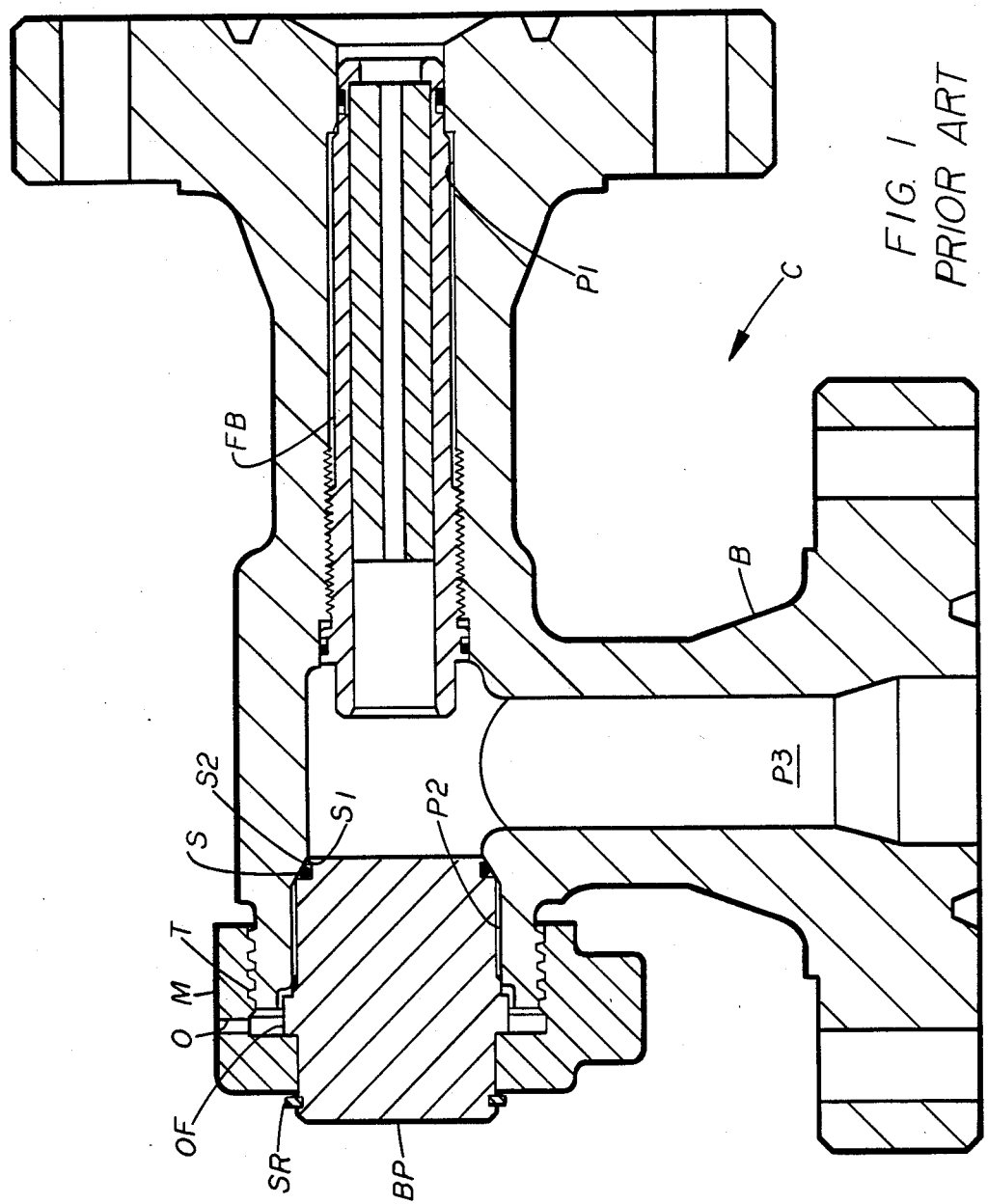
FIG. 1 is a sectional view of a prior art choke having a flow bean mounted in one of its body passages and a blanking plug secured in another of its body passages.
Figure 2:
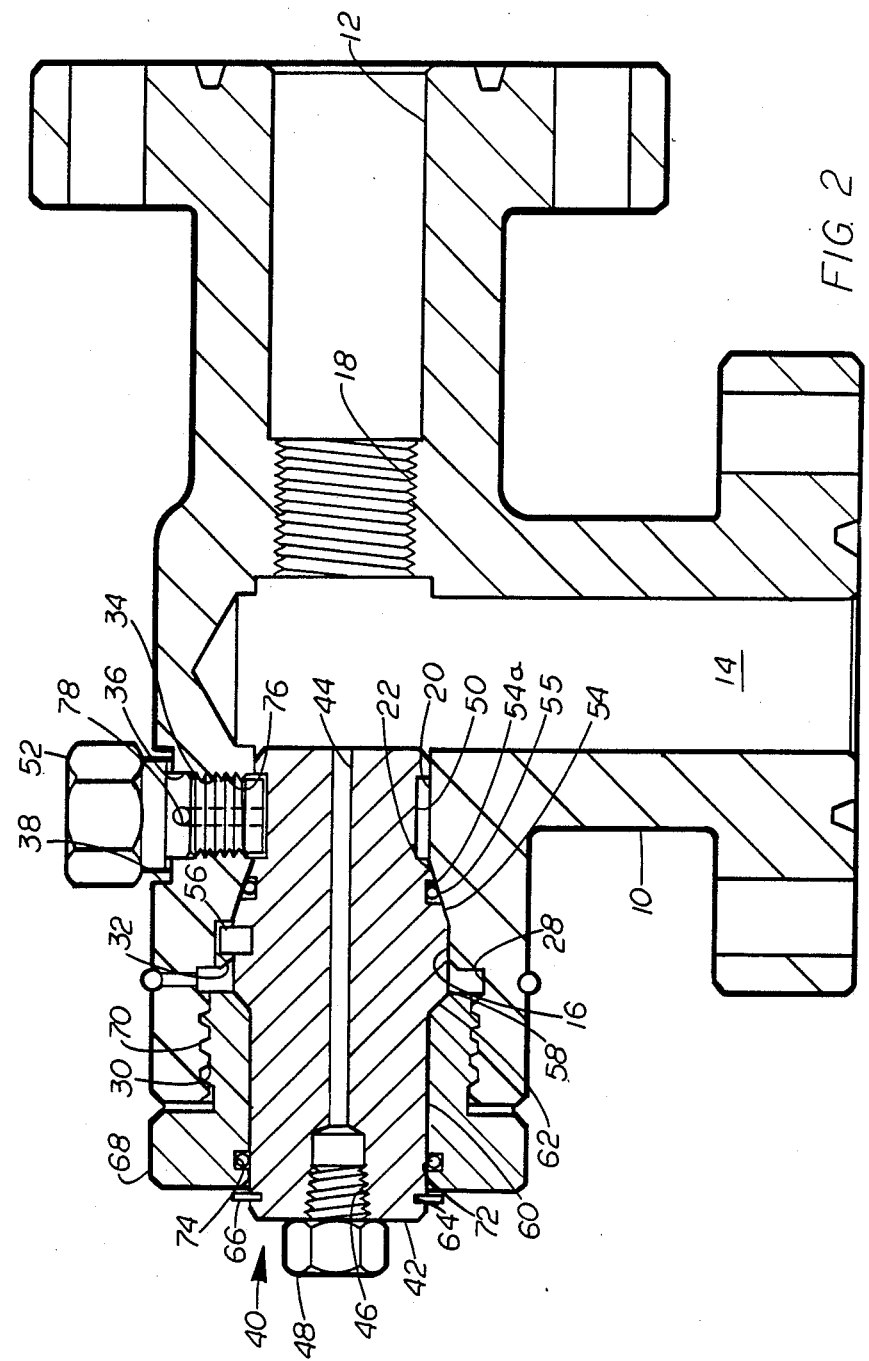
FIG. 2 is a sectional view of a portion of the body of a choke adapted to use a flow bean for its flow restriction and illustrating the improved connection of the present invention securing a blanking plug into the choke body.

In the improved structure of the present invention as shown in FIG. 2, choke body 10 includes internal intersecting passages 12, 14, and 16. The internal threading 18 in passage 12 is used to secure a flow bean (not shown) therein as best shown in FIG. 1. Passage 16 includes cylindrical surface 20 at its inner end, tapered sealing surface 22, recess 28 and internal threaded section 30. Slot 32 extends axially in recess 28 for the purpose hereinafter described. Threaded opening 34 extends through body 10 into the interior of passage 16 and includes first annular recess 36 surrounding the external portion of opening 34 and second annular recess 38 surrounding the outer portion of first annular recess 36.

Blanking plug 40 includes body 42 having bore 44 extending therethrough and terminating in threaded outer opening 46 at its outer end with sealing plug 48 secured therein. The inner exterior portion of plug body 42 includes extended groove 50 which aligns with opening 34 so that the inner end of threaded plug 52 which is positioned therein engages within groove 50 to retain body 42 in its sealed position within passage 16. Tapered surface 54 tapers radially outwardly and toward the outer end of passage 16 at the same angle as tapered surface 22 and includes groove 54a in which seal ring 55 is positioned. Seal ring 55 is in sealing engagement with surface 22 when plug 40 is seated on tapered surface 22. Pin 56 is secured in the exterior of plug body 42 and engages in slot 32 to ensure that body 42 moves completely into passage so that its tapered surface 54 and seal ring 55 are in sealing engagement with surface 22 on the interior of passage 16.

Figure 3:
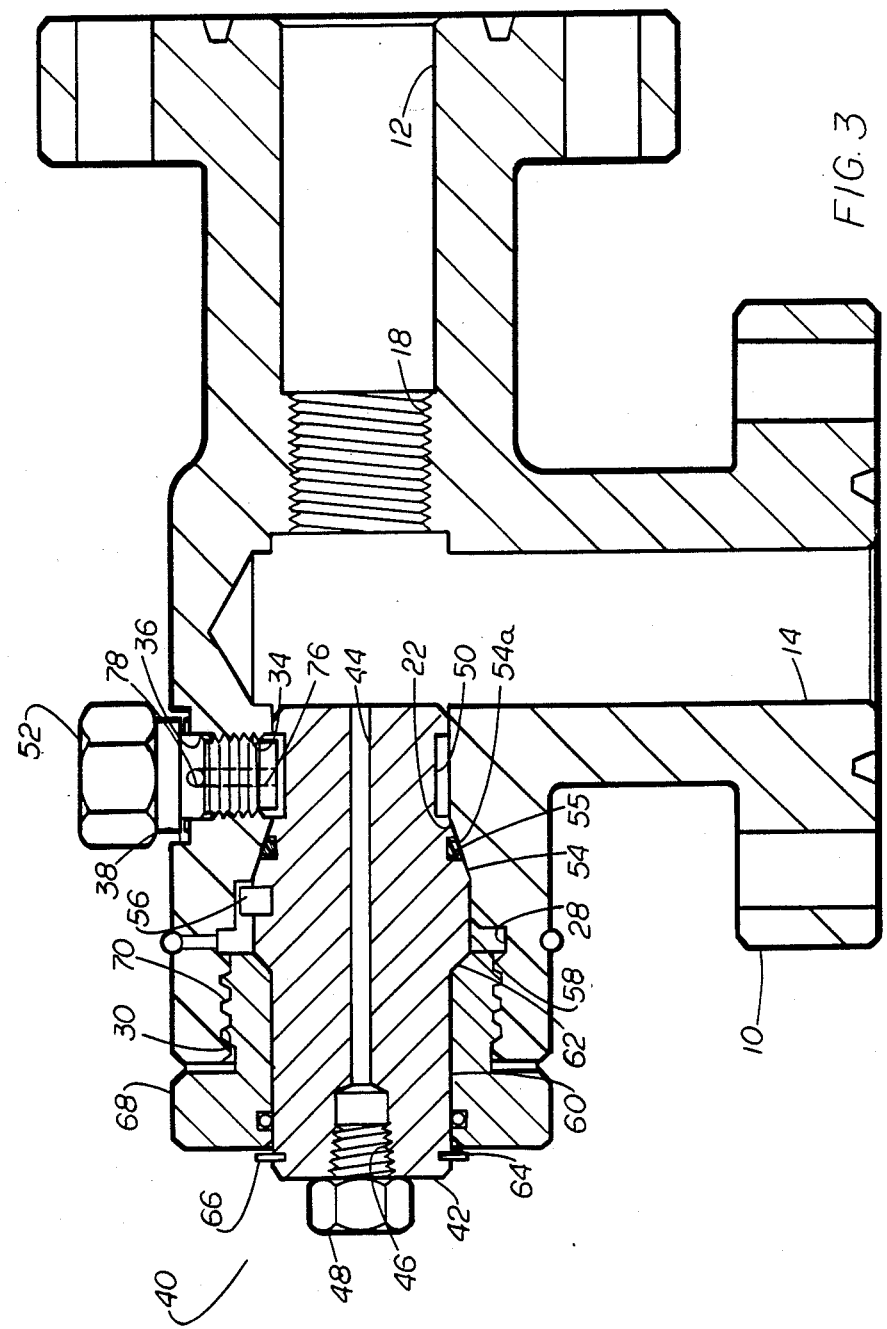
FIG. 3 is another view of the choke body shown in FIG. 2 with venting of the choke body while the blanking plug is still secured within choke body passage.

The exterior of body 42 is a cylindrical surface 58 over the portion outward of tapered surface 54 and outward of pin 56 is reduced in diameter to surface 60 with shoulder 62 between surfaces 54 and 58. Groove 64 is positioned in surface 60 at a point relatively close to the outer end of body 42 to receive snap ring 66. Nut 68 is held in position around the exterior of body 42 engaging around surface 58 and shoulder 62 as shown. Snap ring 66 retains nut 68 in this position. Nut 68 includes external threads 70 which mate within threaded section 30 of passage 16. Seal ring 72 is positioned in groove 74 around the interior of nut 68 and functions to provide a seal between the interior of nut 68 and surface 60 on body 42. Opening 76 extends axially through the threaded plug 52 and ends in transverse port 78 which exits the threaded plug 52 in the area of sealing engagement with first annular recess 36 so that when threaded plug 52 is fully in engagement within opening 34 port 78 is sealed against first annular recess 36. A small rotation of threaded plug 52 is sufficient to move port 78 to its open position without removing the inner end of plug 52 from within groove 64 on the exterior of plug body 42 as shown in FIG. 3, to ensure that plug body 42 is not released from its position within passage 16 even if nut 68 does not retain it in its sealed position during the venting of any fluid pressure from within body 10.

Figure 4:
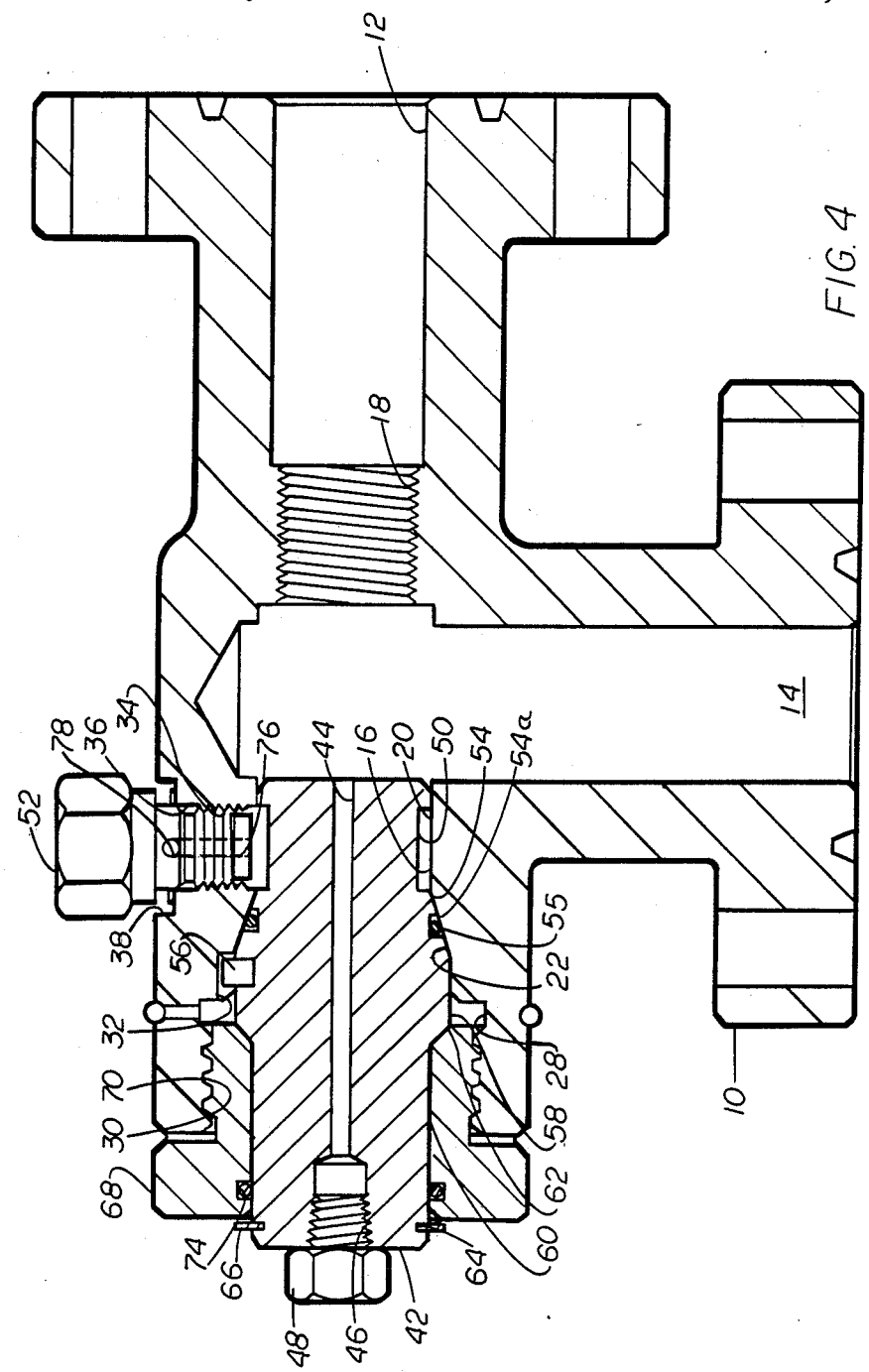
FIG. 4 is a sectional view of the choke body and connection shown in FIGS. 2 and 3 and showing the release the blanking plug following venting but prior to the unthreading of the gland nut.

Further movement of plug 52 outward in opening 34 moves its inner end completely out of engagement with the groove 50 on plug body 42, as shown in FIG. 4, to allow release and removal of plug 40 by unthreading nut 68 as shown in FIG. 5.

Figure 6:
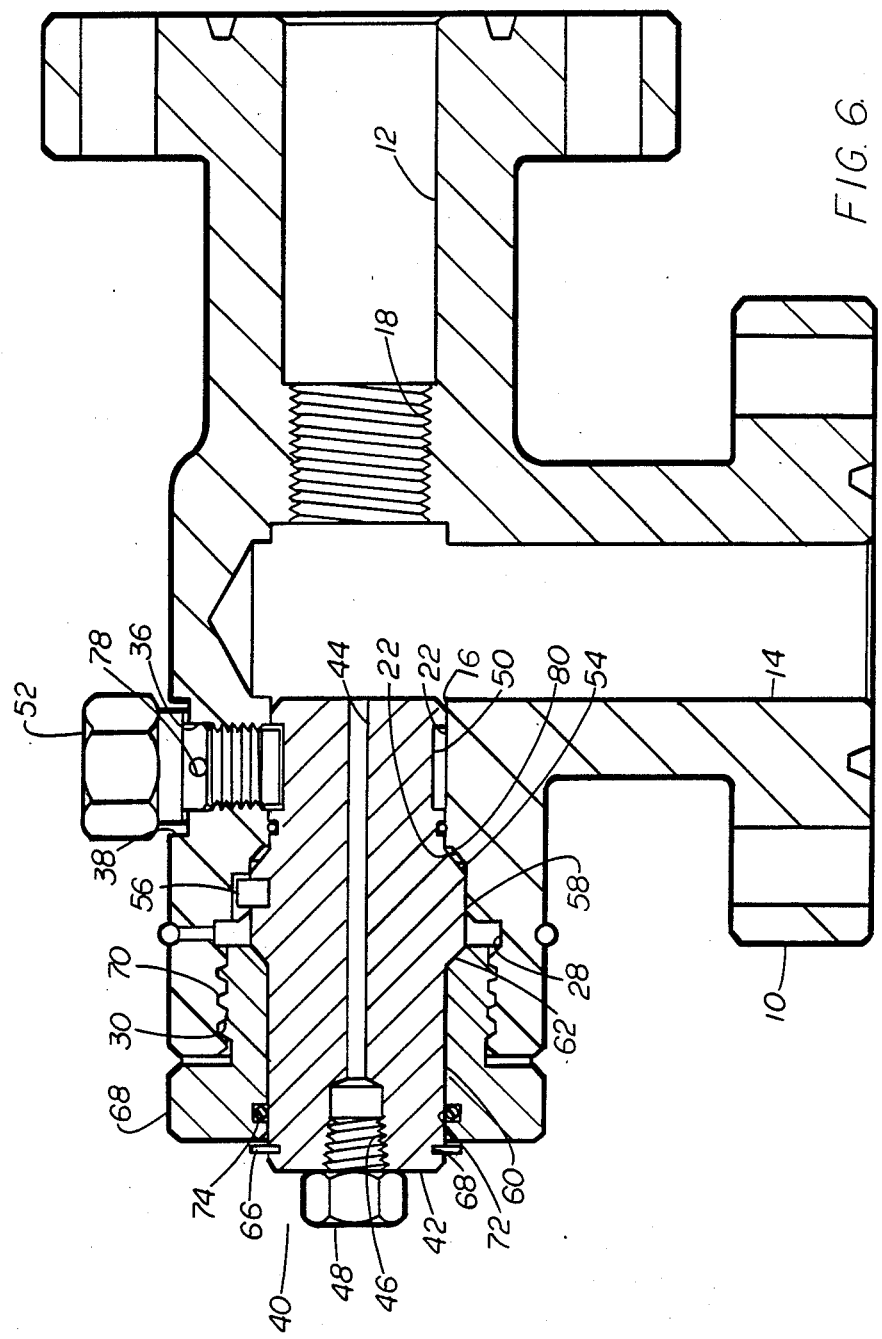
FIG. 6 is a sectional view similar to FIG. 2 but showing a modified form of the connection.

The modified form of the present invention in FIG. 6 is substantially identical with the form previously described except that tapered surface 54 on plug body 42 does not include a groove with a seal ring therein. Rather tapered metal seal ring 80 is provided and tapered surface 54 has a taper which is preferred to taper in the outward direction to converge slightly with the taper on the tapered surface 22. In this manner whenever there is a pressure within passage 16, such pressure is exerted on the inner surface of metal seal ring 80 and forces it outwardly into tighter sealing engagement between the surfaces.

What is claimed is:

1. An apparatus for connecting into one of the passages of a choke body comprising
    a body adapted to fit within the passage of the choke body,
    means on said body for sealing between said body and said passage when said body is seated within said passage,
    a threaded opening extending radially through said choke body into the interior of said passage,
    a groove around the exterior of said body which is axially positioned on said body in registry with said opening when said body is seated within said passage,
    a bleed plug threaded through said opening and engaging within said groove during normal operations to retain said body in a sealed position with said passage, and
    means for securing said body within said passage.

2. An apparatus according to claim 1 including means for sealing between the exterior of said body and the interior of said passage.

3. An apparatus for connecting into one of the passages of a choke body comprising
    a body adapted to fit within the passage of the choke body,
    a threaded opening extending through said choke body into the interior of said passage,
    a groove around the exterior of said body which is axially positioned on said body in registry with said opening when said body is seated within said passage,
    a bleed plug threaded through said opening and engaging within said groove during normal operations,
    a means for securing said body within said passage, and
    means for sealing between the exterior of said body and the interior of said passage, said sealing means including,
    mating surfaces on said body and within said passage, and
    a resilient seal ring positioned between said mating surfaces for sealing therebetween.

4. An apparatus for connecting into one of the passages of a choke body comprising
    a body adapted to fit within the passage of the choke body,
    a threaded opening extending through said choke body into the interior of said passage,
    a groove around the exterior of said body which is axially positioned on said body in registry with said opening when said body is seated within said passage,
    a bleed plug threaded through said opening and engaging within said groove during normal operations,
    means for securing said body within said passage, and
    means for sealing between the exterior of said body and the interior of said passage, said sealing means including sealing surfaces on said body and within said passage, and a metal seal ring positioned between said sealing surfaces.

5. An apparatus according to claim 1 wherein said securing means includes a nut positioned in surrounding relationship to said body and being in threaded engagement with the choke body to retain said body within said passage.

6. An apparatus according to claim 1 wherein said bleed plug includes a vent passage therethrough and unthreading of said bleed plug sufficiently to open said vent passage does not disengage said bleed plug from its engagement within said body groove whereby said body cannot be removed from said passage without first opening flow through said vent passage.

* * * * *